United States Patent

Gong

(10) Patent No.: US 12,517,777 B2
(45) Date of Patent: Jan. 6, 2026

(54) SEMICONDUCTOR DEVICE AND SERIAL COMMUNICATION INTERFACE CONTROL METHOD

(71) Applicant: RENESAS ELECTRONICS CORPORATION, Tokyo (JP)

(72) Inventor: Zheng Gong, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 18/468,021

(22) Filed: Sep. 15, 2023

(65) Prior Publication Data

US 2024/0126629 A1   Apr. 18, 2024

(30) Foreign Application Priority Data

Oct. 18, 2022   (JP) ................................ 2022-166816

(51) Int. Cl.
*G06F 11/00* (2006.01)
*G06F 1/06* (2006.01)
*G06F 11/07* (2006.01)

(52) U.S. Cl.
CPC ............ *G06F 11/076* (2013.01); *G06F 1/06* (2013.01); *G06F 11/0793* (2013.01)

(58) Field of Classification Search
CPC ............ G06F 11/076; G06F 11/0793; G06F 11/1604; G06F 11/1679
See application file for complete search history.

(56) References Cited

U.S. PATENT DOCUMENTS

| | | | |
|---|---|---|---|
| 7,620,075 B2 | 11/2009 | Ishimoto | |
| 8,645,742 B2 | 2/2014 | Mitsuishi | |
| 2003/0210738 A1* | 11/2003 | Shona | H04L 25/45 375/354 |
| 2006/0245515 A1 | 11/2006 | Tachi | |

FOREIGN PATENT DOCUMENTS

| | | |
|---|---|---|
| JP | 2006-311237 A | 11/2006 |
| JP | 2007-324679 A | 12/2007 |
| JP | 2011-114630 A | 6/2011 |

* cited by examiner

*Primary Examiner* — Katherine Lin
(74) *Attorney, Agent, or Firm* — Rimon P.C.

(57) ABSTRACT

A semiconductor device includes a first clock; a second clock; a first baud rate generator generating the basic clock by using the first clock; a second baud rate generator generating the basic clock by using the second clock; and a control circuit correcting the first baud rate generator. The control circuit includes: a correction operation signal output circuit outputting a correction operation signal on the basis of the second clock of the second baud rate generator; and a correction value setting circuit outputting a correction value setting signal on the basis of the correction operation signal. The second baud rate generator counts a correction period in accordance with the correction operation signal by using the first clock on the basis of the correction value setting signal, and sets a baud rate correction value on the basis of a count result.

5 Claims, 9 Drawing Sheets

FIG. 9

|  | CORRECTION PERIOD | CURRENT CUT RATE PER 10-BIT COMMUNICATION |
|---|---|---|
| FIRST EMBODIMENT | 1/2-BIT PERIOD | 61.4% |
| SECOND EMBODIMENT | 1-BIT PERIOD | 57.7% |
| THIRD EMBODIMENT | 1/4-BIT PERIOD | 64.9% |

SEMICONDUCTOR DEVICE AND SERIAL COMMUNICATION INTERFACE CONTROL METHOD

CROSS-REFERENCE TO RELATED APPLICATION

The disclosure of Japanese Patent Application No. 2022-166816 filed on Oct. 18, 2022, including the specification, drawings and abstract is incorporated herein by reference in its entirety.

BACKGROUND

The present disclosure relates to a serial communication baud rate generator that corrects a baud rate of serial communication.

In recent years, a control system vehicle-mounted network that couples ECUs (electronic control units) to be mounted on an automobile has widely spread. Currently, typical examples of a communication protocol for the control system vehicle-mounted network include a CAN (Controller Area Network), a LIN (Local Interconnect Network), and a FlexRay. The CAN has been mainly adopted as a standard for a power train system or chassis system network. The LIN has been adopted as a standard for a body system serial communication network to be used at a relatively low speed (a transmission speed of 1 to 20 kbps). The FlexRay is standardized to correspond to an X-by-wire application.

The LIN is a serial communication protocol defined as a standard by a LIN consortium to achieve communication with a high cost efficiency among various types of sensors and actuators each having a sophisticated function in the vehicle-mounted network. The LIN is used for communication among devices each requiring neither a bandwidth nor a diversity that are required to some extent for the CAN. For example, the LIN is used as a communication path until information is delivered from each of the various types of sensors to the CAN. The LIN is lower in cost than the CAN and the FlexRay.

In a standard for the LIN, a UART (Universal Asynchronous Receiver Transmitter) interface that has already spread as a communication system is used. Although a network topology of the LIN is not particularly defined, a bus topology is basically adopted. The LIN includes one master node and a plurality of slave nodes that are connected to each other via a bus. Currently, the number of slave nodes that can be connected to one master node is defined up to a maximum of 15. A microcomputer including a CPU is exemplified as the master node and the slave node. In the master node, a storage device stores a program for executing a master task and a program for executing a slave task. The master task is a task for determining a transfer timing and a transfer destination of a frame. The slave task is for preparing a data field to be transferred for each frame. In the slave node, only the slave task is executed, and therefore, a storage device stores the program for the slave task. Note that the storage device in the slave node may store the master program. When the LIN operates as the slave node, the master program may be controlled not to be executed by a program. The CPU in the master node transmits a frame header to the slave node by executing the master task. The CPU in the slave node executes the slave task, and transmits a response (including a data field) in response to the frame header. The master node can also execute the slave task, and therefore, can transmit the response including the data field subsequently to the header.

The frame header to be transmitted to the slave node by the master node includes a synch break field (break field), a synch field (synchronization byte), and an ID field (protection ID) in this order from the head. A response including a data field composed of a maximum of eight bytes and a 1-byte checksum is transferred subsequently to the header. The brake field is constituted by a low level (dominant level) composed of 13 bits or more. The synch field is a 8-bit data value 0x55. The ID field is constituted by a 6-bit ID and a 2-bit parity.

An access system in the LIN is a time trigger system. Accordingly, a message sequence is previously set as a transfer schedule in the master task. The master node can execute an application as a LIN cluster and manage a network. That is, all tasks in the LIN are managed in terms of time. Accordingly, messages do not collide with each other as long as synchronization therebetween is established.

To establish synchronization in the LIN is to correct a cycle of a sampling clock for acquiring or transmitting serial data to match a reference cycle. Usually, the synchronization is established by correcting a baud rate of the slave node to match a baud rate of the master node. The slave node corrects the baud rate on the basis of a reference clock (synch field) to be transmitted from the master node. The baud rate is corrected for each arrival of the header.

In this respect, various techniques for correcting the baud rate are proposed (see the Patent Documents 1 to 3).

There are disclosed techniques listed below.

[Patent Document 1] Japanese Unexamined Patent Application Publication No. 2006-311237

[Patent Document 2] Japanese Unexamined Patent Application Publication No. 2007-324679

[Patent Document 3] Japanese Unexamined Patent Application Publication No. 2011-114630

SUMMARY

Meanwhile, it is necessary to further improve the reduction in power consumption.

The present disclosure has been made to solve the above-described problem, and provides a semiconductor device and a serial communication interface control method capable of correcting the baud rate achieving the reduction in power consumption.

Other problems and novel characteristics will be apparent from the description of the present specification and the accompanying drawings.

A semiconductor device according to the present disclosure includes a serial communication interface performing ordered communication between itself and outside in accordance with a unit transfer time based on a basic clock. The serial communication interface includes: a first clock; a second clock having a higher accuracy and power consumption than those of the first clock; a first baud rate generator generating the basic clock by using the first clock; a second baud rate generator generating the basic clock by using the second clock; and a control circuit correcting the first baud rate generator. The control circuit includes: a correction operation signal output circuit outputting a correction operation signal on the basis of the second clock of the second baud rate generator; and a correction value setting circuit outputting a correction value setting signal on the basis of the correction operation signal. The second baud rate generator counts a correction period in accordance with the correction operation signal by using the first clock on the basis of the correction value setting signal, and a baud rate correction value is set on the basis of a count result.

A serial communication interface control method according to the present disclosure is a method of controlling a serial communication interface performing ordered communication between itself and outside in accordance with a unit transfer time based on a basic clock, and the method includes: a step of generating the basic clock by using a first clock; a step of generating a correction operation signal on the basis of a second clock having a higher accuracy and power consumption than those of the first clock; a step of counting a correction period in accordance with the correction operation signal by using the first clock, and setting a baud rate correction value on the basis of a count result.

A semiconductor device and a serial communication interface control method according to the present disclosure are capable of correcting a baud rate capable of reducing power consumption.

BRIEF DESCRIPTIONS OF THE DRAWINGS

FIG. 9 is a diagram for explaining respective reductions in power consumptions of configurations according to the first to third embodiments and a comparative example.

DETAILED DESCRIPTION

Figure 1:
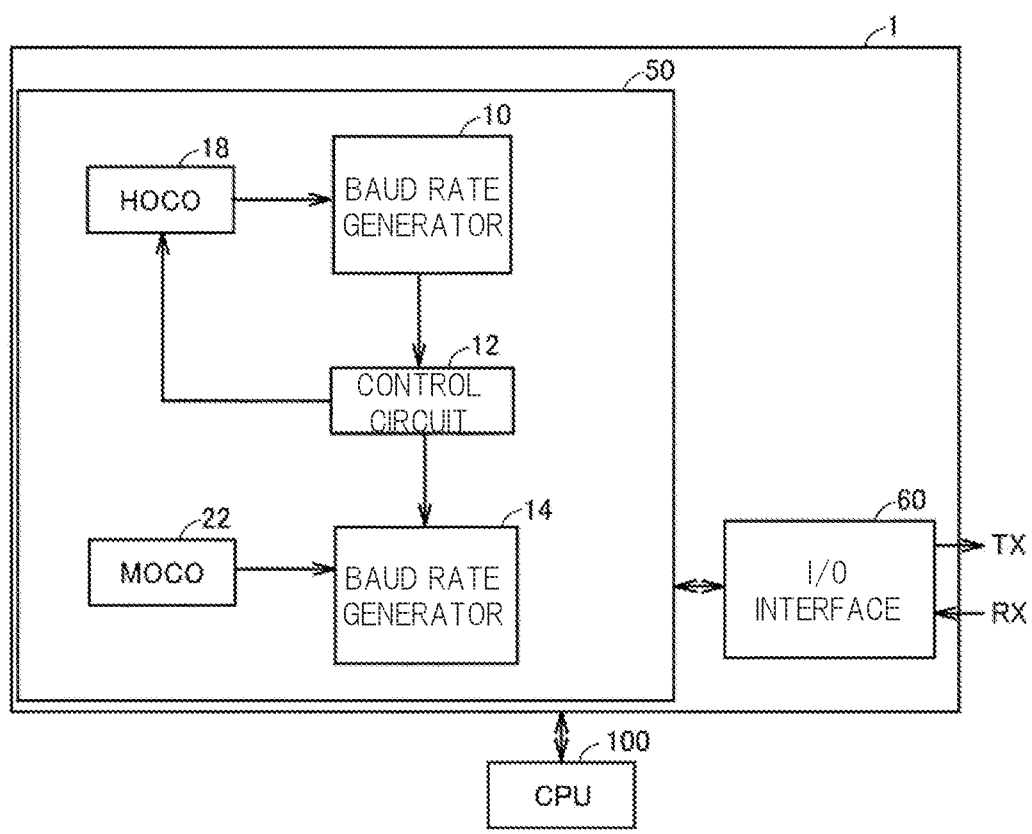
FIG. 1 is a diagram for explaining a serial communication system according to a first embodiment.

Embodiments will be described in detail with reference to the drawings. The same or similar components in the drawings are respectively denoted by the same reference numerals, and description thereof is not repeated.

First Embodiment

FIG. 1 is a diagram for explaining a serial communication system according to a first embodiment.

With reference to FIG. 1, a LIN (Local Interconnect Network) communication system using a LIN communication protocol will be described as an example of the serial communication system according to the first embodiment.

The serial communication system according to the present disclosure includes a master node not illustrated and at least one slave node. Serial communication is performed between the master node and the slave node.

In this example, the slave node will be described.

The slave node includes a serial communication circuit 1 and a CPU 100. The serial communication circuit 1 is a serial communication interface exemplified by a UART.

The serial communication circuit 1 includes a baud rate control unit 50 and an I/O interface 60. The baud rate control unit 50 performs serial communication with, for example, the master node via the I/O interface 60.

The baud rate control unit 50 includes baud rate generators 10 and 14, a control circuit 12, a high-speed on-chip oscillator (HOCO) 18, and a middle-speed on-chip oscillator (MOCO) 22.

The control circuit 12 controls an operation for correcting the baud rate generator 14.

The HOCO 18 outputs a highly accurate clock signal CLK2.

The baud rate generator 10 acquires reception data RX in response to input of the clock signal CLK2 from the HOCO 18.

The MOCO 22 outputs a clock signal CLK1. The clock signal CLK1 is lower in clock accuracy than the clock signal CLK2. On the other hand, the MOCO 22 is lower in power consumption than the HOCO 18.

The baud rate generator 14 acquires reception data RX in accordance with input of the clock signal CLK1 from the MOCO 22 and an instruction from the control circuit 12.

Figure 2:
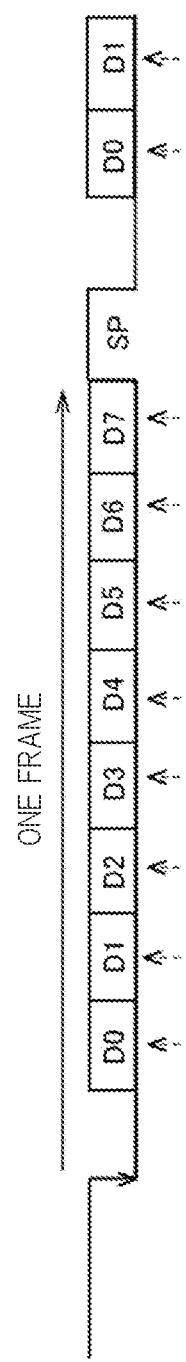
FIG. 2 is a diagram for explaining a reception timing of reception data RX.

FIG. 2 is a diagram for explaining a reception timing of reception data RX.

With reference to FIG. 2, it is necessary before communication to previously determine a communication speed (baud rate) between devices that perform transmission and reception to and from each other since there is no clock signal.

Specifically, it is necessary to detect a drop edge (a start bit ST) of a data line, and capture data for each bit time determined based on the baud rate. In this respect, the capture of the data needs to match a timing in the middle of a 1-bit time. Accordingly, an accuracy is required for an operation clock.

In this respect, the MOCO 22 is lower in power consumption but is also lower in clock accuracy than the HOCO 18.

Therefore, there is a problem in terms of capturing data at a proper timing when data is captured using only the MOCO 22.

In this example, a system for generating a highly accurate basic clock (a capture signal CP) using the clock signal CLK2 to be output from the HOCO 18 will be described.

Figure 3:
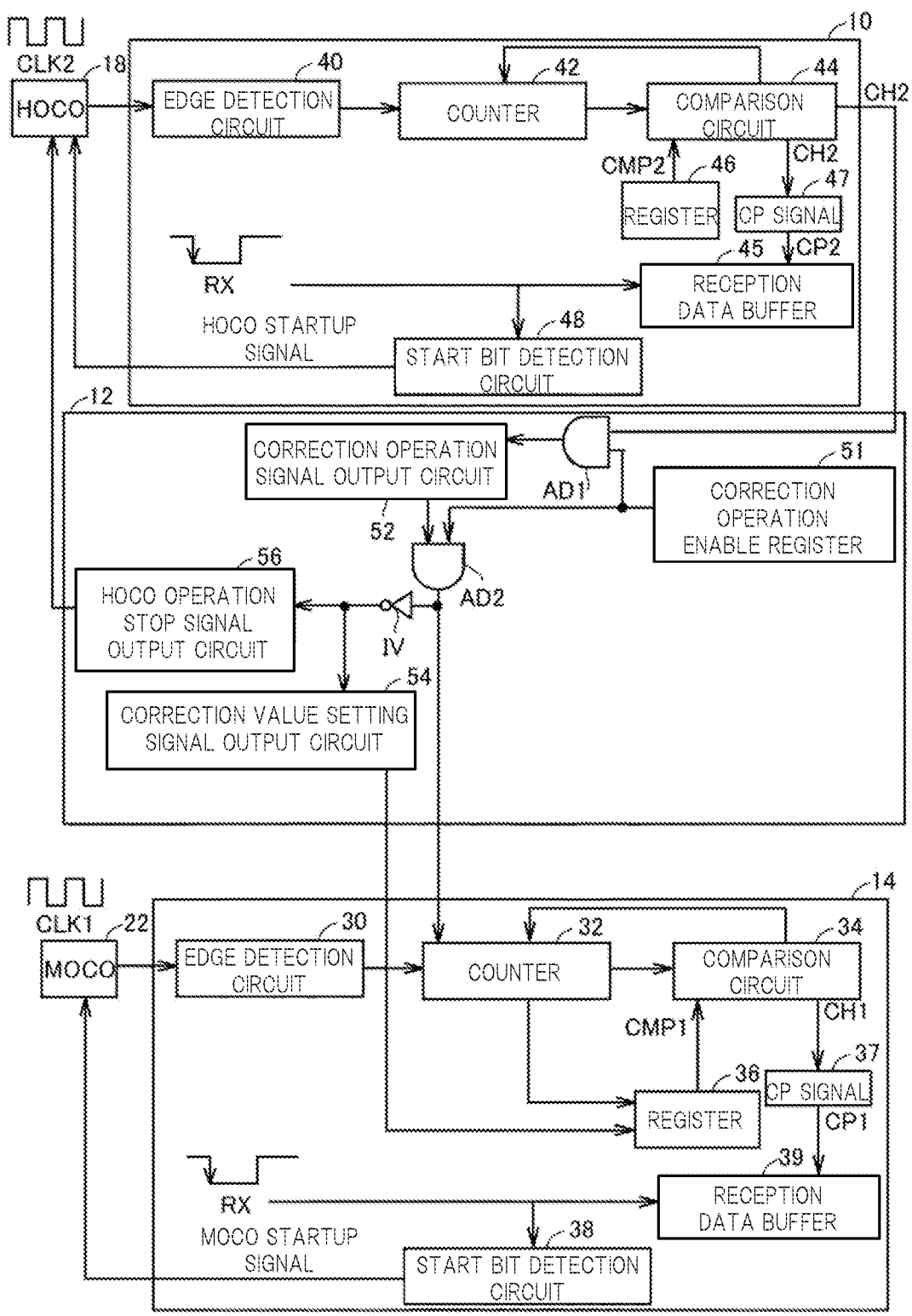
FIG. 3 is a diagram for explaining a circuit configuration of a baud rate control unit 50 according to the first embodiment.

FIG. 3 is a diagram for explaining a circuit configuration of the baud rate control unit 50 according to the first embodiment.

With reference to FIG. 3, the baud rate generator 10 includes an edge detection circuit 40, a counter 42, a comparison circuit 44, a register 46, a capture signal generation circuit 47, a start bit detection circuit 48, and a reception data buffer 45.

The edge detection circuit 40 detects an edge of a clock signal CLK2 in response to the clock signal CLK2 from the HOCO 18, and outputs a detection signal to the counter 42.

The counter 42 performs counting up in response to the detection signal from the edge detection circuit 40.

The counter 42 outputs a count value to the comparison circuit 44.

The comparison circuit 44 compares a comparison value CMP2 stored in the register 46 with the count value, and outputs a match detection signal CH2 when they match each other. The counter 42 performs a reset operation in accordance with the match detection signal CH2 from the comparison circuit 44.

Based on the match detection signal CH2, a capture signal CP2 as a basic clock for defining a reception timing of reception data RX is generated.

The capture signal generation circuit 47 generates the capture signal CP2 on the basis of the match detection signal CH2. The capture signal generation circuit 47 includes an internal counter, and outputs a capture signal CP2 (of an "H" level) when a counter value of the internal counter is set to "1" in this example. Then, when the match detection signal CH2 is input, the counter value is set to zero. Therefore, the capture signal generation circuit 47 outputs one capture signal CP2 (of an "H" level) for every two inputs of the match detection signal CH2.

The reception data buffer 45 sequentially stores reception data RX in accordance with a timing of the capture signal CP2.

The start bit detection circuit 48 detects a start bit of the reception data RX. Specifically, the start bit detection circuit 48 detects drop of an "L" level of the reception data RX, and starts a receiving operation. Specifically, the start bit detection circuit 48 outputs an HOCO startup signal for starting up the HOCO 18.

The baud rate generator 14 includes an edge detection circuit 30, a counter 32, a comparison circuit 34, a register 36, a capture signal generation circuit 37, a start bit detection circuit 38, and a reception data buffer 39.

The edge detection circuit 30 detects an edge of a clock signal CLK1 in response to the clock signal CLK1 from the MOCO 22, and outputs a detection signal to the counter 32.

The counter 32 performs counting up in response to the detection signal from the edge detection circuit 30.

The counter 32 starts a startup operation in accordance with a correction operation signal. The counter 32 performs a reset operation in accordance with a correction value setting signal or a match detection signal CH1.

The counter 32 outputs a count value to the comparison circuit 34 and the register 36.

The comparison circuit 34 compares a comparison value CMP1 stored in the register 36 with the count value, and outputs a match detection signal CH1 when they match each other.

Based on the match detection signal CH1, a capture signal CP1 as a basic clock for defining a reception timing of reception data RX is generated.

The register 36 stores the count value to be output from the counter 32 in accordance with the correction value setting signal.

The capture signal generation unit 37 generates the capture signal CP1 on the basis of the match detection signal CH1. The capture signal generation circuit 37 includes an internal counter, and outputs a capture signal CP1 (of an "H" level) when a counter value of the internal counter is set to "1" in this example. Then, when the match detection signal CH1 is input, the counter value is set to zero. Therefore, the capture signal generation circuit 37 outputs one capture signal CP1 (of an "H" level) for every two inputs of the match detection signal CH1.

The reception data buffer 39 sequentially stores reception data RX in accordance with a timing of the capture signal CP1.

The start bit detection circuit 38 detects a start bit of the reception data RX. Specifically, the start bit detection circuit 38 detects drop of an "L" level of the reception data RX, and starts a receiving operation. Specifically, the start bit detection circuit 38 outputs an MOCO startup signal for starting up the MOCO 22.

In this example, the baud generators 10 and 14 have basically similar configurations.

The control circuit 12 controls an operation for correcting the baud rate generator 14.

The control circuit 12 includes a correction operation enable register 51, a correction operation signal output circuit 52, a correction value setting signal output circuit 54, an HOCO operation stop signal output circuit 56, AND circuits AD1 and AD2, and an inverter IV.

The correction operation enable register 51 stores a register value. Specifically, when the operation for correcting the baud rate generator 14 is performed, the register value is set to "1". On the other hand, when the operation for correcting the baud rate generator 14 is not performed, the register value is set to "0". The register value is provided to be settable on the basis of a signal from outside, although not illustrated.

To the correction operation signal output circuit 52, the AND circuit AD1 outputs a result of an AND logical operation of the match detection signal CH2 from the comparison circuit 44 and a signal based on the register value from the correction operation enable register 51.

The correction operation signal output circuit 52 outputs a correction operation signal.

To the counter 32, the AND circuit AD2 outputs a result of an AND logical operation of the correction operation signal from the correction operation signal output circuit 52 and the signal based on the register value from the correction operation enable register 51. An output signal of the AND circuit AD2 is input to the HOCO operation stop signal output circuit 56 and the correction value setting signal output circuit 54 via the inverter IV.

The signal based on the register value from the correction operation enable register 51 is input to the AND circuits AD1 and AD2, and therefore, when the register value is "0", the correction operation signal output circuit 52 does not operate. That is, the correction operation is not performed.

In this example, a case where the register value is "1" will be described as an example.

When the register value is "1", the match detection signal CH2 is transmitted from the comparison circuit 44 to the correction operation signal output circuit 52.

The correction operation signal output circuit 52 activates the correction operation signal (brings the correction operation signal into an "H" level) in accordance with the match detection signal CH2 firstly output from the comparison circuit 44. And, this inactivates the correction operation signal (brings the correction operation signal into an "L" level) in accordance with the match detection signal CH2 secondly output from the comparison circuit 44.

The HOCO operation stop signal output circuit 56 operates in response to input of the correction operation signal via the inverter IV. The HOCO operation stop signal output circuit 56 receives an input of an "H" level when the correction operation signal reaches an "L" level. Accordingly, the HOCO operation stop signal output circuit 56 outputs an instruction to stop the HOCO 18.

The correction value setting signal output circuit 54 operates in response to input of the correction operation signal via the inverter IV. The correction value setting signal output circuit 54 receives an input of an "H" level when the correction operation signal reaches an "L" level. Accordingly, the correction value setting signal output circuit 54 outputs a correction value setting signal (of an "H" level) for setting a correction value in the register 36.

Figure 4:
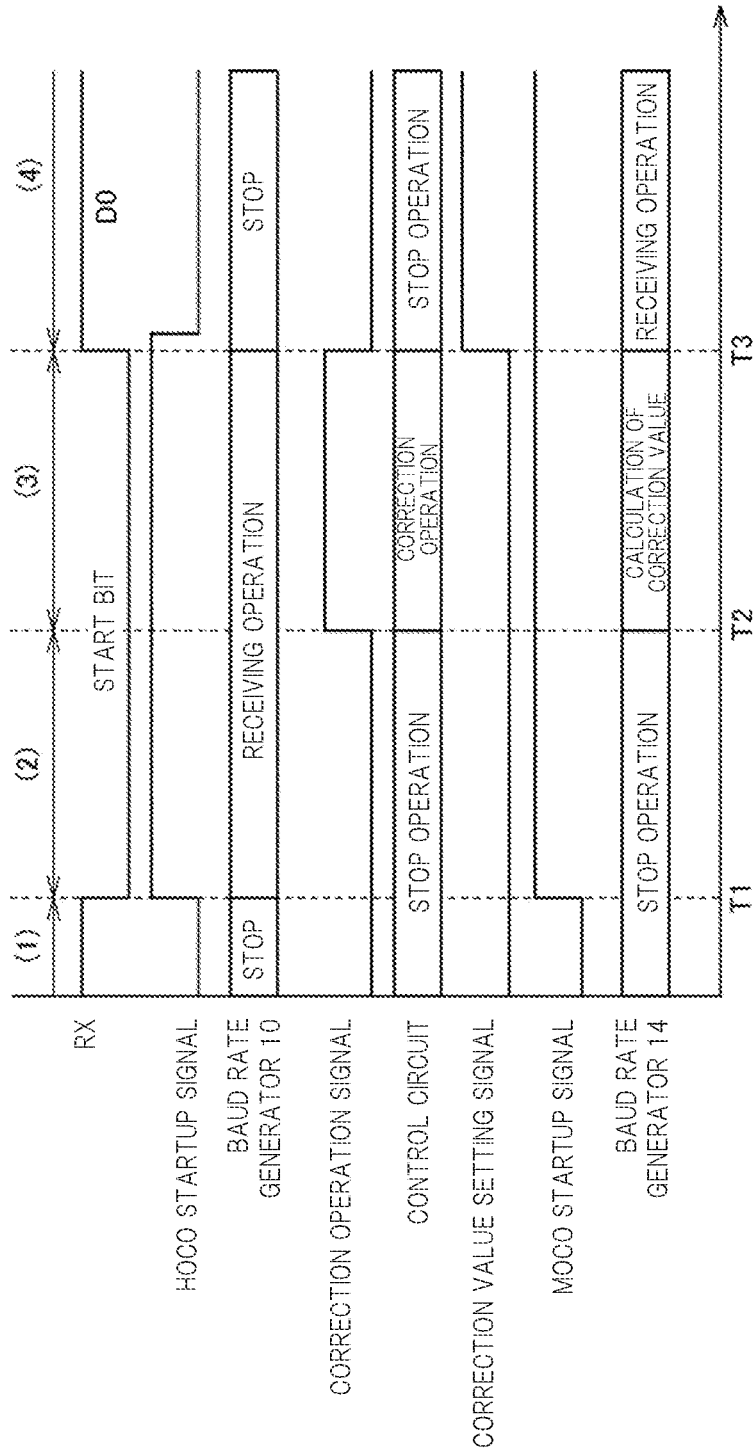
FIG. 4 is a conceptual diagram for explaining an operation of a serial communication circuit according to the first embodiment.

FIG. 4 is a conceptual diagram for explaining an operation of the serial communication circuit according to the first embodiment.

With reference to FIG. 4, at a time T1, the start bit detection circuit 48 in the baud rate generator 10 detects a start bit of reception data RX, and outputs an HOCO startup signal. The start bit detection circuit 38 in the baud rate generator 14 detects a start bit of reception data RX, and outputs an MOCO startup signal.

As a result, the HOCO 18 outputs a clock signal CLK2. The MOCO 22 outputs a clock signal CLK1.

Then, at a time T2, the comparison circuit 44 in the baud rate generator 10 outputs a match detection signal CH2 (of an "H" level) on the basis of a result of comparison between a comparison value CMP2 stored in the register 46 and a count value. The comparison value CMP2 is set such that the counter 42 counts an edge of the clock signal CLK2 and outputs the match detection signal CH2 at a timing corresponding to a center value of a start bit period. Accordingly, the correction operation signal output circuit 52 outputs a correction operation signal (of an "H" level).

The baud rate generator 14 starts a correction operation in response to input of the correction operation signal (of an "H" level). Specifically, the baud rate generator 14 calculates a correction value in response to the correction operation signal.

Then, at a time T3, the comparison circuit 44 in the baud rate generator 10 outputs a match detection signal CH2 (of an "H" level) on the basis of a result of comparison between a comparison value CMP2 stored in the register 46 and a count value. The comparison value CMP2 is set such that the counter 42 counts an edge of the clock signal CLK2 and outputs the match detection signal HT2 at a timing corresponding to a center value of a start bit period. Accordingly, the time T3 corresponds to an end time of the start bit. The correction operation signal output circuit 52 outputs a correction operation signal (of an "L" level) in accordance with the secondly-output match detection signal CH2 (of an "H" level).

The correction value setting signal output circuit 54 outputs a correction value setting signal (of an "H" level) in accordance with the correction operation signal (of an "L" level).

Further, the HOCO operation stop signal output circuit 56 outputs an instruction to stop the HOCO 18.

In the baud rate generator 14, a correction value calculated in response to the correction value setting signal is held in the register 36. The baud rate generator 14 performs an operation for receiving the reception data RX on the basis of this correction value.

The correction value is set to a value as a timing corresponding to a center value of the 1-bit time. Accordingly, the reception data RX can be accurately captured.

As illustrated in this example, all internal circuits in the serial communication circuit 1 are stopped until the start bit is transmitted.

After the start bit of the reception data RX ends, the HOCO 18 is stopped. Accordingly, the baud rate generator 10 stops operating, and only the baud rate generator 14 continues to operate.

Therefore, the baud rate generator 10 is driven only in the start bit period, and is stopped in the other period, and therefore, the power consumption can be reduced.

Figure 5:
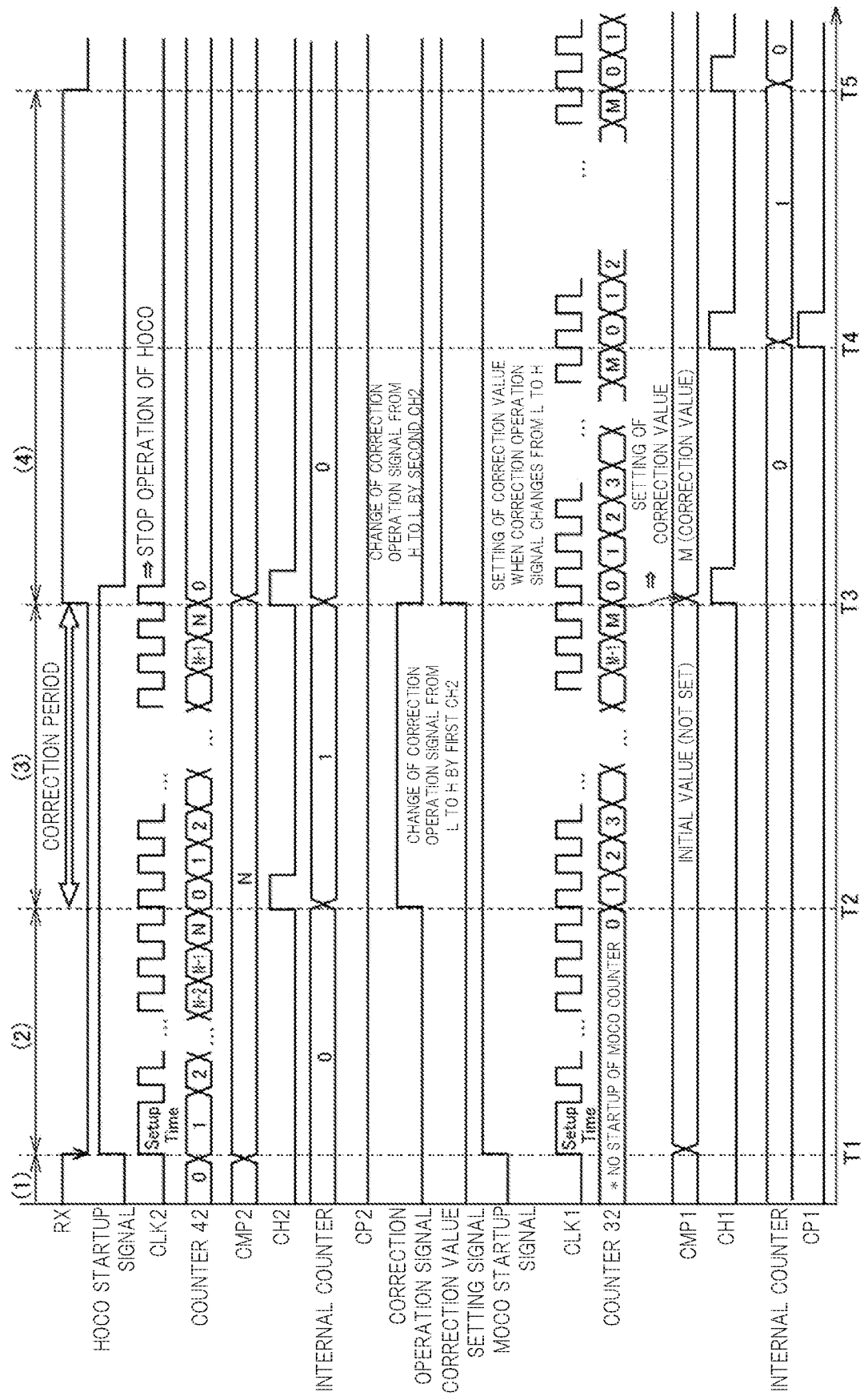
FIG. 5 is a timing chart for explaining a detailed operation of the serial communication circuit according to the first embodiment.

FIG. 5 is a timing chart for explaining a detailed operation of the serial communication circuit based on the first embodiment.

With reference to FIG. 5, at a time T1, the start bit detection circuit 48 in the baud rate generator 10 detects a start bit of reception data RX, and outputs an HOCO startup signal. The start bit detection circuit 38 in the baud rate generator 14 detects a start bit of reception data RX, and outputs an MOCO startup signal.

As a result, the HOCO 18 outputs a clock signal CLK2. The MOCO 22 outputs a clock signal CLK1.

Then, the comparison circuit 44 in the baud rate generator 10 outputs a match detection signal CH2 (of an "H" level) on the basis of a result of comparison between a comparison value CMP2(N) stored in the register 46 and a count value. At a time T2, the correction operation signal output circuit 52 outputs a correction operation signal (of an "H" level). The counter 42 is reset in accordance with the match detection signal HT2.

The counter 32 in the baud rate generator 14 starts counting in response to the correction operation signal (of an "H" level).

Then, the comparison circuit 44 in the baud rate generator 10 outputs a match detection signal CH2 (of an "H" level) again on the basis of a result of comparison between a comparison value CMP2(N) stored in the register 46 and a count value. At a time T3, the correction operation signal output circuit 52 outputs a correction operation signal (of an "L" level).

The correction value setting signal output circuit 54 outputs a correction value setting signal (of an "H" level) in response to the correction operation signal (of an "L" level).

The register 36 in the baud rate generator 14 sets a value counted by the counter 32 in response to the correction value setting signal (of an "H" level) as a correction value. This example shows a case where a counter value (M) is registered in the register 36. The counter 32 in the baud rate generator 14 is reset in accordance with the correction value setting signal (of an "H" level) or a match detection signal CH1.

Then, at a time T4, the comparison circuit 34 in the baud rate generator 14 outputs a match detection signal CH1 (of an "H" level) on the basis of a result of comparison between a comparison value CMP1(M) stored in the register 36 and a count value.

At the time T4, the capture signal generation circuit 37 includes an internal counter, and outputs a capture signal CP1 (of an "H" level) when the internal counter is "1" in this example.

The reception data buffer 45 performs an operation for receiving the reception data RX in accordance with the capture signal CP1 (of an "H" level).

Then, at a time T5, the comparison circuit 34 in the baud rate generator 14 outputs a match detection signal CH1 (of an "H" level) on the basis of a result of comparison between a comparison value CMP1(M) stored in the register 36 and a count value.

At the time T5, the capture signal generation circuit 37 includes an internal counter, and the internal counter is "0" in this example. In this case, a capture signal CP1 (of an "L" level) is output. In this case, the reception data buffer 45 does not perform an operation for receiving the reception data RX because of the capture signal CP1 (of an "L" level).

Then, when the match detection signal CH1 (of an "H" level) is output, the capture signal generation circuit 37 outputs a capture signal CP1 (of an "H" level"). The reception data buffer 45 performs an operation for receiving the reception data RX in accordance with the capture signal CP1 (of an "H" level). The same applies to subsequent processing.

In the present embodiment, the capture signal CP1 (of an "H" level) is set to a value as a timing corresponding to the center value of the 1-bit time. Accordingly, the reception data RX can be accurately captured.

As illustrated in this example, all internal circuits in the serial communication circuit 1 are stopped until the start bit receives.

After the start bit ends, the baud rate generator 10 stops operating, and only the baud rate generator 14 continues to operate.

Therefore, the baud rate generator 10 is driven only in the start bit period, and is stopped in the other period, and therefore, power consumption can be reduced.

Second Embodiment

In the above-described first embodiment, a system for designating a correction operation period as a ½-bit period and setting a correction value within the period has been described.

On the other hand, the present invention is not limited to this, but the correction operation period can also be designated as a 1-bit period.

Specifically, a register 46 has a plurality of comparison values CMP2. As an example, the first comparison value CMP2 is set to "N". The comparison value CMP2(N) is set such that a counter 42 counts an edge of a clock signal CLK2 and outputs a match detection signal CH2 at a timing corresponding to a center value of a start bit period.

Then, the second comparison value CMP2 is set to "2N". The comparison value CMP2(2N) is set such that a match detection signal CH2 is output at a timing corresponding to a 1-bit period.

In this example, a capture signal generation circuit 47 inactivates an internal counter. That is, the capture signal generation circuit 47 outputs a capture signal CP2 (of an "H" level) in accordance with input of a match detection signal CH2 (of an "H" level). Therefore, the capture signal generation circuit 47 outputs one capture signal CP2 (of an "H" level) for every one input of the match detection signal CH2.

Similarly, a capture signal generation circuit 37 inactivates an internal counter. That is, the capture signal generation circuit 37 outputs a capture signal CP1 (of an "H" level) in accordance with input of a match detection signal CH1 (of an "H" level). Therefore, the capture signal generation circuit 37 outputs one capture signal CP1 (of an "H" level) for every one input of the match detection signal CH1.

Figure 6:
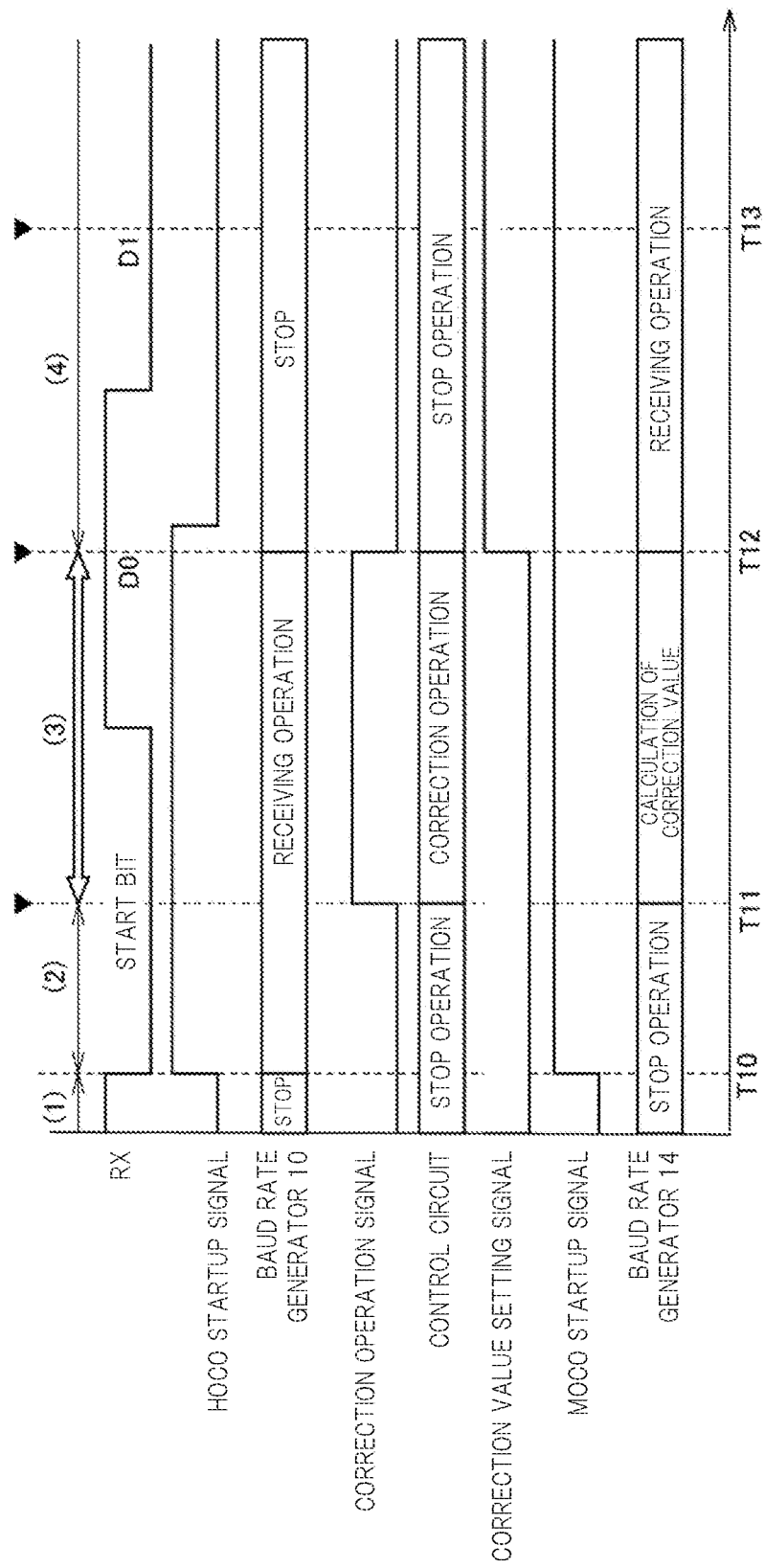
FIG. 6 is a conceptual diagram for explaining an operation of a serial communication circuit according to a second embodiment.

FIG. 6 is a conceptual diagram for explaining an operation of a serial communication circuit according to a second embodiment.

With reference to FIG. 6, at a time T10, a start bit detection circuit 48 in a baud rate generator 10 detects a start bit of reception data RX, and outputs an HOCO startup signal. A start bit detection circuit 38 in a baud rate generator 14 detects a start bit of reception data RX, and outputs an MOCO startup signal.

As a result, an HOCO 18 outputs a clock signal CLK2. An MOCO 22 outputs a clock signal CLK1.

Then, at a time T1*l*, a comparison circuit 44 in the baud rate generator 10 outputs a match detection signal CH2 (of an "H" level) on the basis of a result of comparison between a first comparison value CMP2(N) stored in the register 46 and a count value. The comparison value CMP2 is set such that the counter 42 counts an edge of the clock signal CLK2 and outputs the match detection signal CH2 at a timing corresponding to a center value of a start bit period. Accordingly, a correction operation signal output circuit 52 outputs a correction operation signal (of an "H" level).

The baud rate generator 14 starts a correction operation in response to input of the correction operation signal (of an "H" level). Specifically, the baud rate generator 14 calculates a correction value in response to the correction operation signal.

Then, at a time T12, the comparison circuit 44 in the baud rate generator 10 outputs a match detection signal CH2 on the basis of a result of comparison between a second comparison value CMP2(2N) stored in the register 46 and a count value. The correction operation signal output circuit 52 outputs a correction operation signal (of an "L" level) in response to input of the secondly-output match detection signal CH2.

A correction value setting signal output circuit 54 outputs a correction value setting signal (of an "H" level) in response to the correction operation signal (of an "L" level).

A register 36 in the baud rate generator 14 sets a value counted by a counter 32 in response to the correction value setting signal (of an "H" level) as a correction value. This example shows a case where a counter value (M #) is registered in the register 36. The counter 32 in the baud rate generator 14 is reset in accordance with the correction value setting signal (of an "H" level) or a match detection signal CH1.

The baud rate generator 14 holds the correction value (M #) calculated in response to the correction value setting signal. The baud rate generator 14 performs an operation for receiving the reception data RX on the basis of the correction value (M #).

The correction value (M #) is at a timing of an elapse of the 1-bit time from reception of data D0. Accordingly, the reception data RX such as data D1 can be accurately captured.

As shown in this example, all internal circuits in a serial communication circuit 1 are stopped until the start bit receives.

After the correction operation ends, the baud rate generator 10 stops operating, and only the baud rate generator 14 continues to operate.

Therefore, power consumption can be reduced since the baud rate generator 10 is stopped in a period other than the correction operation.

The 1-bit period of the clock signal CLK1 to be output from the MOCO 22 is accurately measured for the correction, and therefore, the reception data RX can be detected at a more accurate timing than in the first embodiment.

Third Embodiment

In the above-described first embodiment, the case where the correction operation period is designated as the ½-bit period has been described. In the second embodiment, the case where the correction operation period is designated as the 1-bit period has been described. That is, in this example, the correction operation period can be designated as a 1/n-bit period. As an example, a case where the correction operation period is designated as a ¼-bit period will be described.

Specifically, a register 46 has a plurality of comparison values CMP2. As an example, the first comparison value CMP2 is set to "N". The comparison value CMP2(N) is set such that a counter 42 counts an edge of a clock signal CLK2 and outputs a match detection signal CH2 at a timing corresponding to a center value of a start bit period.

Then, the second comparison value CMP2 is set to "N/2". The comparison value CMP2(N/2) is set such that a match detection signal CH2 is output at a timing corresponding to the ¼-bit period.

In this example, a capture signal generation circuit 47 is provided with an internal counter, and a counter value of the internal counter changes in accordance with a capture signal CP2. In this example, a case where the counter value changes from 0 to 3 will be described. If the counter value of the internal counter is set to "3", the counter value of the internal counter is reset to "0" in response to input of a match detection signal CH2 (of an "H" level). In this example, when the counter value of the internal counter is "1", the capture signal CP2 is set to an "H" level.

The capture signal generation circuit 47 outputs one capture signal CP2 (of an "H" level) for every four inputs of the match detection signal CH2.

Similarly, a capture signal generation circuit 37 is provided with an internal counter, and a counter value of the internal counter changes in accordance with a capture signal CP1. In this example, a case where the counter value changes from "0 to 3" will be described. If the counter value of the internal counter is set to "3", the counter value of the internal counter is reset to "0" when a match detection signal CH1 (of an "H" level) is input. In this example, when the counter value of the internal counter is "3", the capture signal CP2 is set to an "H" level. The capture signal generation circuit 37 outputs one capture signal CP1 (of an "H" level) for every four inputs of the match detection signal CH1.

Figure 7:
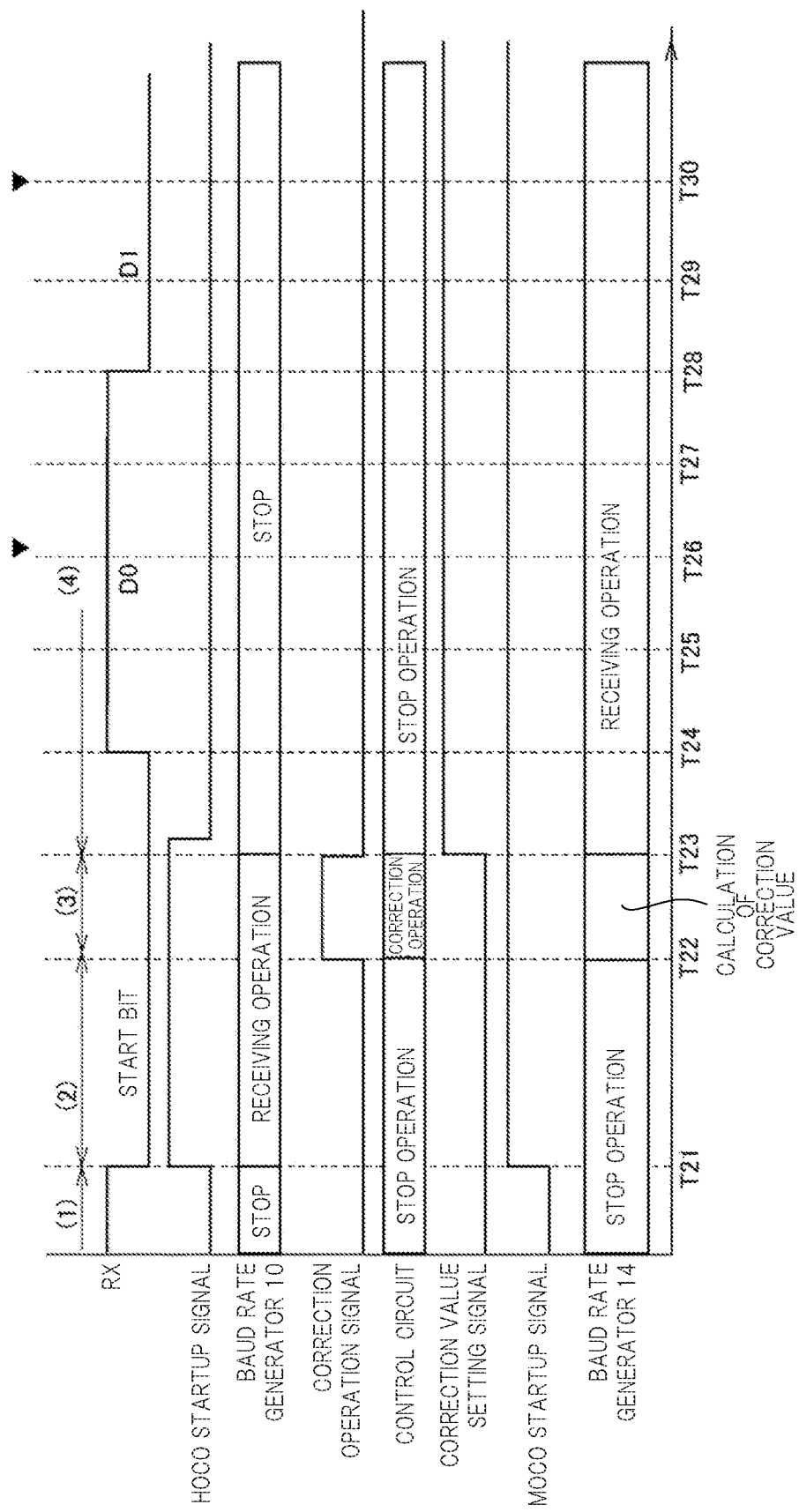
FIG. 7 is a conceptual diagram for explaining an operation of a serial communication circuit according to a third embodiment.

FIG. 7 is a conceptual diagram for explaining an operation of a serial communication circuit according to a third embodiment.

With reference to FIG. 7, at a time T21, a start bit detection circuit 48 in a baud rate generator 10 detects a start bit of reception data RX, and outputs an HOCO startup signal. A start bit detection circuit 38 in a baud rate generator 14 detects a start bit of reception data RX, and outputs an MOCO startup signal.

As a result, an HOCO 18 outputs a clock signal CLK2. An MOCO 22 outputs a clock signal CLK1.

Then, at a time T22, a comparison circuit 44 in the baud rate generator 10 outputs a match detection signal CH2 (of an "H" level) on the basis of a result of comparison between a first comparison value CMP2(N) stored in the register 46 and a count value. The comparison value CMP2 is set such that the counter 42 counts an edge of the clock signal CLK2 and outputs the match detection signal CH2 at a timing corresponding to a center value of a start bit period. Accordingly, a correction operation signal output circuit 52 outputs a correction operation signal (of an "H" level).

The baud rate generator 14 starts a correction operation in response to input of the correction operation signal (of an "H" level). Specifically, the baud rate generator 14 calculates a correction value in response to the correction operation signal.

Then, at a time T23, the comparison circuit 44 in the baud rate generator 10 outputs a match detection signal CH2 (of an "H" level) on the basis of a result of comparison between a second comparison value CMP2(N/2) stored in the register 46 and a count value.

At the time T23, the correction operation signal output circuit 52 outputs a correction operation signal (of an "L" level).

A correction value setting signal output circuit 54 outputs a correction value setting signal (of an "H" level) in response to the correction operation signal (of an "L" level).

A register 36 in the baud rate generator 14 sets a value counted by a counter 32 in response to the correction value setting signal (of an "H" level) as a correction value. This example shows a case where a counter value (MP) is registered in the register 36. The counter 32 in the baud rate generator 14 is reset in accordance with the correction value setting signal (of an "H" level) or a match detection signal CH1.

Then, at a time T24, a comparison circuit 34 in the baud rate generator 14 outputs a match detection signal CH1 (of an "H" level) on the basis of a result of comparison between a comparison value CMP1(MP) stored in the register 36 and a count value.

At the time T24, the capture signal generation circuit 37 includes an internal counter, and the internal counter is set to "1" in this example.

Then, at a time T25, the comparison circuit 34 in the baud rate generator 14 outputs a match detection signal CH1 (of an "H" level) on the basis of a result of comparison between a comparison value CMP1(MP) stored in the register 36 and a count value.

At the time T25, the capture signal generation circuit 37 includes an internal counter, and the internal counter is set to "2" in this example.

Then, at a time T26, the comparison circuit 34 in the baud rate generator 14 outputs a match detection signal CH1 (of an "H" level) on the basis of a result of comparison between a comparison value CMP1(MP) stored in the register 36 and a count value.

At the time T26, the capture signal generation circuit 37 includes an internal counter, and the internal counter is set to "3" in this example.

The capture signal generation circuit 37 outputs a capture signal CP1 (of an "H" level) when the internal counter is "3" in this example.

A reception data buffer 45 performs an operation for receiving the reception data RX in accordance with the capture signal CP1 (of an "H" level).

Then, at a time T27, the comparison circuit 34 in the baud rate generator 14 outputs a match detection signal CH1 (of an "H" level) on the basis of a result of comparison between a comparison value CMP1(M) stored in the register 36 and a count value.

At the time T27, the capture signal generation circuit 37 includes an internal counter, and the internal counter is "0" in this example.

Then, at a time T28, the comparison circuit 34 in the baud rate generator 14 outputs a match detection signal CH1 (of an "H" level) on the basis of a result of comparison between a comparison value CMP1(M) stored in the register 36 and a count value.

At the time T28, the capture signal generation circuit 37 includes an internal counter, and the internal counter is "1" in this example.

Then, at a time T29, the comparison circuit 34 in the baud rate generator 14 outputs a match detection signal CH1 (of an "H" level) on the basis of a result of comparison between a comparison value CMP1(M) stored in the register 36 and a count value.

At the time T29, the capture signal generation circuit 37 includes an internal counter, and the internal counter is "2" in this example.

Then, at a time T30, the comparison circuit 34 in the baud rate generator 14 outputs a match detection signal CH1 (of an "H" level) on the basis of a result of comparison between a comparison value CMP1(M) stored in the register 36 and a count value.

At the time T30, the capture signal generation circuit 37 includes an internal counter, and the internal counter is "3" in this example. The capture signal generation circuit 37 outputs a capture signal CP1 (of an "H" level) when the internal counter is "3" in this example.

A reception data buffer 45 performs an operation for receiving the reception data RX in accordance with the capture signal CP1 (of an "H" level). The same applies to subsequent processing.

The correction value (MP) corresponds to the ¼-bit period.

The baud rate generator 14 performs an operation for receiving the reception data RX on the basis of the correction value. Specifically, first data D0 is captured in response to the capture signal CP1 (of an "H" level) when the internal counter in the capture signal generation circuit 37 is "3".

Then, next data D1 is also captured in response to the capture signal CP1 (of an "H" level) when the internal counter in the capture signal generation circuit 37 is "3". The reception data RX can be similarly accurately captured thereafter.

As shown in this example, all internal circuits in the serial communication circuit 1 are stopped until the start bit receives.

After the correction operation ends, the baud rate generator 10 stops operating, and only the baud rate generator 14 continues to operate.

Therefore, the power consumption can be reduced since the baud rate generator 10 is stopped in a period other than the correction operation.

When the correction operation period is shortened, an operation period of the baud rate generator 10 can be shortened to reduce the power consumption.

Figure 8:
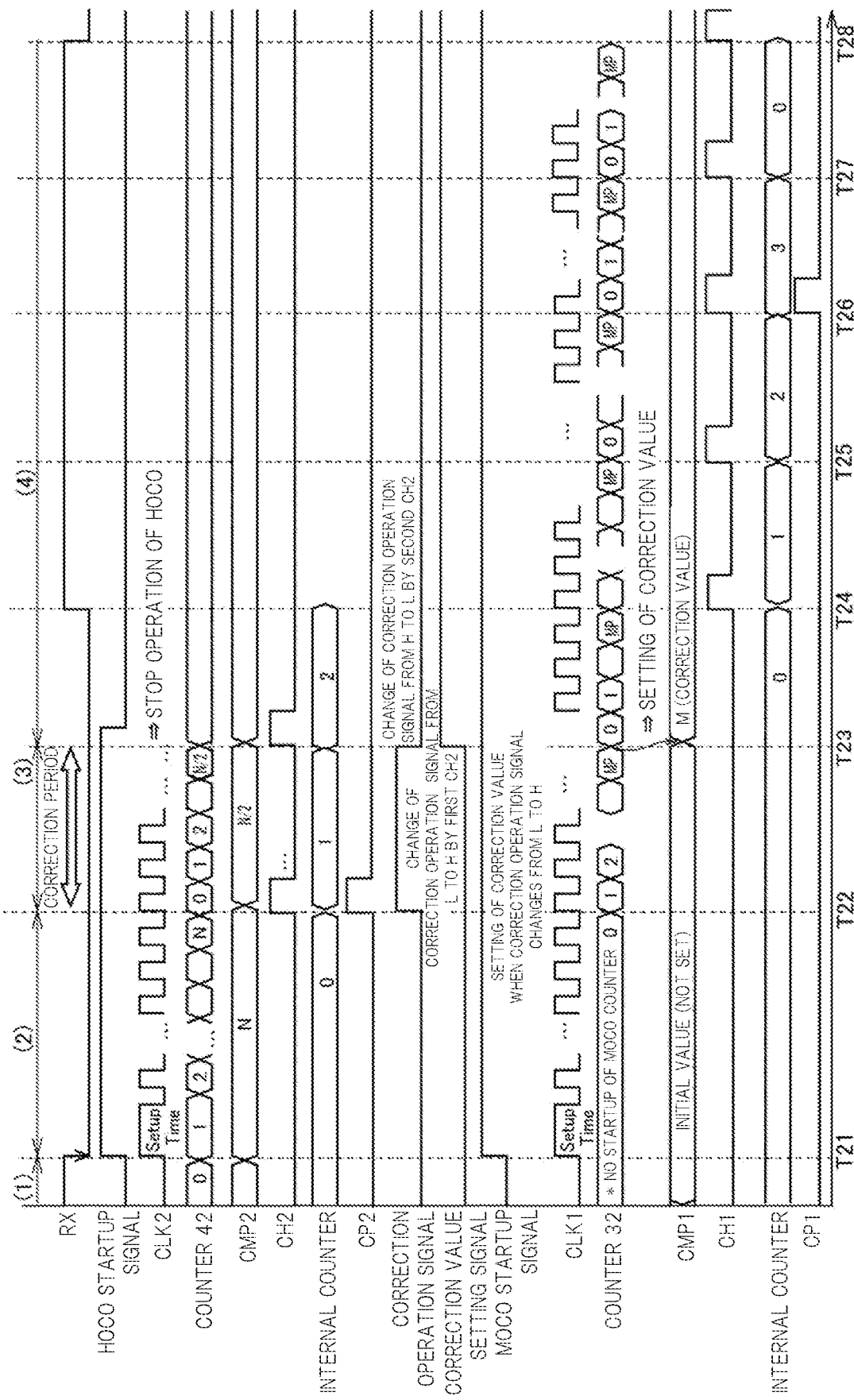
FIG. 8 is a timing chart for explaining a detailed operation of the serial communication circuit according to the third embodiment.

FIG. 8 is a timing chart for explaining a detailed operation of the serial communication circuit according to the third embodiment.

With reference to FIG. 8, at a time T21, the start bit detection circuit 48 in the baud rate generator 10 detects a start bit of reception data RX, and outputs an HOCO startup signal. The start bit detection circuit 38 in the baud rate generator 14 detects a start bit of reception data RX, and outputs an MOCO startup signal.

As a result, the HOCO 18 outputs a clock signal CLK2. The MOCO 22 outputs a clock signal CLK1.

Then, the comparison circuit 44 in the baud rate generator 10 outputs a match detection signal CH2 (of an "H" level) on the basis of a result of comparison between a comparison value CMP2(N) stored in the register 46 and a count value. At a time T22, the correction operation signal output circuit 52 outputs a correction operation signal (of an "H" level). The counter 42 is reset in accordance with the match detection signal HT2.

The counter 32 in the baud rate generator 14 starts counting in response to the correction operation signal (of an "H" level).

Then, the comparison circuit 44 in the baud rate generator 10 outputs a match detection signal CH2 (of an "H" level) again on the basis of a result of comparison between a comparison value CMP2(N/2) stored in the register 46 and a count value. At a time T23, the correction operation signal output circuit 52 outputs a correction operation signal (of an "L" level).

The correction value setting signal output circuit 54 outputs a correction value setting signal (of an "H" level) in response to the correction operation signal (of an "L" level).

The register 36 in the baud rate generator 14 sets a value counted by the counter 32 in response to the correction value setting signal (of an "H" level) as a correction value. This example shows a case where a counter value (MP) is registered in the register 36. The counter 32 in the baud rate generator 14 is reset in accordance with the correction value setting signal (of an "H" level) or a match detection signal CH1.

Then, at a time T24, the comparison circuit 34 in the baud rate generator 14 outputs a match detection signal CH1 (of an "H" level) on the basis of a result of comparison between a comparison value CMP1(MP) stored in the register 36 and a count value.

At the time T24, the capture signal generation circuit 37 includes an internal counter, and the internal counter is set to "1" in this example.

Then, at a time T25, the comparison circuit 34 in the baud rate generator 14 outputs a match detection signal CH1 (of an "H" level) on the basis of a result of comparison between a comparison value CMP1(MP) stored in the register 36 and a count value.

At the time T25, the capture signal generation circuit 37 includes an internal counter, and the internal counter is set to "2" in this example.

Then, at a time T26, the comparison circuit 34 in the baud rate generator 14 outputs a match detection signal CH1 (of an "H" level) on the basis of a result of comparison between a comparison value CMP1(MP) stored in the register 36 and a count value.

At the time T26, the capture signal generation circuit 37 includes an internal counter, and the internal counter is set to "3" in this example.

The capture signal generation circuit 37 outputs a capture signal CP1 (of an "H" level) when the internal counter is "3" in this example.

The reception data buffer 45 performs an operation for receiving the reception data RX in accordance with the capture signal CP1 (of an "H" level).

Then, at a time T27, the comparison circuit 34 in the baud rate generator 14 outputs a match detection signal CH1 (of an "H" level) on the basis of a result of comparison between a comparison value CMP1(M) stored in the register 36 and a count value.

At the time T27, the capture signal generation circuit 37 includes an internal counter, and the internal counter is "0" in this example. In this case, a capture signal CP1 (of an "L" level) is output. In this case, the reception data buffer 45 does not perform an operation for receiving the reception data RX because of the capture signal CP1 (of an "L" level).

In the present embodiment, the capture signal CP1 (of an "H" level) is set to a value as a timing corresponding to a center value of a 1-bit time. Accordingly, the reception data RX can be accurately captured.

As shown in this example, all internal circuits in the serial communication circuit 1 are stopped until the start bit receives.

After the start bit ends, the baud rate generator 10 stops operating, and only the baud rate generator 14 continues to operate.

Therefore, the baud rate generator 10 is driven only in the start bit period, and is stopped in the other period, and therefore, the power consumption can be reduced.

FIG. 9 is a diagram for explaining respective reductions in power consumption of configurations according to the first to third embodiments and the comparative example.

With reference to FIG. 9, the comparative example in this example shows a case where the baud generator 10 and the HOCO 18 do not stop operating.

This example shows a case where a current cut rate is 61.4% when the correction period is set to the ½-bit period.

Also, this example shows a case where the current cut rate is 57.7% when the correction period is set to the 1-bit period.

Also, this example shows a case where the current cut rate is 64.9% when the correction period is set to the ¼-bit period.

This indicates that the power consumption can be reduced when the correction period is shorted.

In the foregoing, the present disclosure has been concretely described on the basis of the embodiments. However, it is needless to say that the present disclosure is not limited to the foregoing embodiments, and various modifications can be made within the scope of the present invention.

What is claimed is:

1. A semiconductor device comprising:
    a central processing unit (CPU); and
    a serial communication circuit receiving instructions from the CPU and performing ordered communication between itself and outside in accordance with a unit transfer time based on a basic clock,
    wherein the serial communication circuit includes:
        a first on-chip oscillator that outputs a first clock;
        a second on-chip oscillator that outputs a second clock having a higher accuracy and higher power consumption than those of the first clock;
        a first baud rate generator generating the basic clock using the first clock;
        a second baud rate generator generating the basic clock using the second clock; and
        a control circuit correcting the first baud rate generator by activating the second baud rate generator,
    wherein the control circuit includes:
        a correction operation signal output circuit outputting a correction operation signal based on the second clock of the second baud rate generator; and
        a correction value setting circuit outputting a correction value setting signal based on the correction operation signal to dynamically adjusts the generation of the basic clock by the first baud rate generator based on a power-efficient correction algorithm,
    wherein the second baud rate generator includes a clock counter circuit that counts a correction period in accordance with the correction operation signal by using the first clock based on the correction value setting signal, and sets a baud rate correction value based on a count result, and
    wherein after setting the baud rate correction value, the second on-chip oscillator is stopped and the second baud rate generator stops operating, and only the first baud rate generator continues to operate based on the correction value, whereby the power consumption of the semiconductor device is reduced.

2. The semiconductor device according to claim 1, wherein starting up of the first and second clocks is triggered by a start bit.

3. The semiconductor device according to claim 2, wherein the second baud rate generator includes:
    a counter performing counting by using the second clock; and
    a comparison circuit outputting a match signal based on a predetermined count value of the counter, and
    wherein the correction operation signal output circuit:
        activates the correction operation signal in accordance with a first match signal; and
        inactivates the correction operation signal in accordance with a second match signal.

4. The semiconductor device according to claim 1, wherein the second baud rate generator stops the second clock when the correction period ends.

5. The semiconductor device according to claim 1, wherein the correction period is a 1/n-bit period.

* * * * *